(12) United States Patent
Wong

(10) Patent No.: US 12,547,057 B2
(45) Date of Patent: Feb. 10, 2026

(54) SYSTEM AND METHOD FOR SYNCHRONIZED MOVEMENT OF OBJECTS IN FRONT OF A CAMERA LENS

(71) Applicant: Nicholas Banner Wong, Seattle, WA (US)

(72) Inventor: Nicholas Banner Wong, Seattle, WA (US)

( * ) Notice: Subject to any disclaimer, the term of this patent is extended or adjusted under 35 U.S.C. 154(b) by 26 days.

(21) Appl. No.: 18/833,122

(22) PCT Filed: Jan. 24, 2023

(86) PCT No.: PCT/US2023/011393
§ 371 (c)(1),
(2) Date: Jul. 25, 2024

(87) PCT Pub. No.: WO2023/146835
PCT Pub. Date: Aug. 3, 2023

(65) Prior Publication Data
US 2025/0130483 A1 Apr. 24, 2025

Related U.S. Application Data

(60) Provisional application No. 63/304,568, filed on Jan. 28, 2022.

(51) Int. Cl.
*G03B 17/56* (2021.01)
*G02B 5/09* (2006.01)
(52) U.S. Cl.
CPC ............. *G03B 17/565* (2013.01); *G02B 5/09* (2013.01)

(58) Field of Classification Search
CPC .... G03B 17/565; G03B 15/08; G03B 17/245; G03B 15/00; G03B 35/10; G03B 11/00; G03B 19/023; G03B 2217/241; G03B 15/12; G02B 27/08; G02B 27/1066; G02B 5/09
See application file for complete search history.

(56) References Cited

U.S. PATENT DOCUMENTS

| 3,930,711 A | 1/1976 | Powell |
| 9,667,845 B2 | 5/2017 | Mirlay |
| 2006/0193641 A1 | 8/2006 | Callahan |

FOREIGN PATENT DOCUMENTS

| EP | 1727356 A2 * | 11/2006 | ............ H04N 23/58 |
| KR | 2013072377 A * | 7/2013 | |
| WO | WO-2020237578 A1 * | 12/2020 | ............... G03B 9/22 |

* cited by examiner

*Primary Examiner* — Christopher E Mahoney
(74) *Attorney, Agent, or Firm* — Sandy Lipkin

(57) ABSTRACT

The present invention is intended to facilitate the creation of artistic effects in photography and videography, made possible by synchronous movement of light path modifying objects. A device according to aspects of the present invention includes a manipulator whose operation synchronously alters the position of light path modifying members. The manipulator may include a transmission. Light path modifying members with different light properties can be used. In some embodiments the members are placed around a space free of objects. The free space may be three-dimensional. In this case the manipulator may be operated to change the placement of the members around the free space. A method creating artistic effects in photography according to some aspects of the invention includes synchronously altering position of a plurality of light path modifying members.

27 Claims, 10 Drawing Sheets

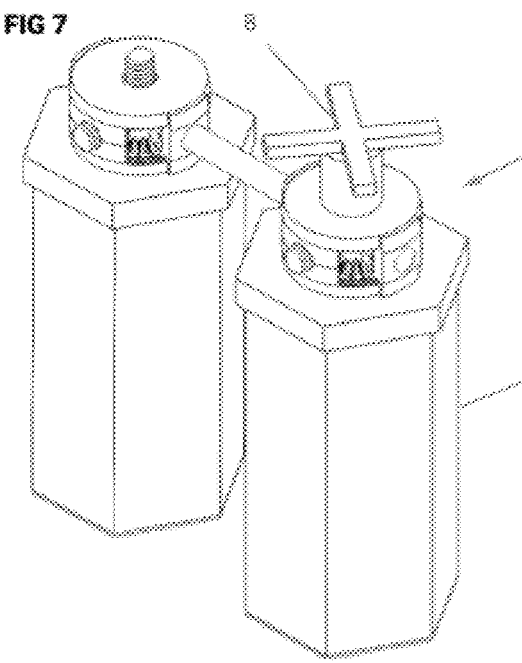
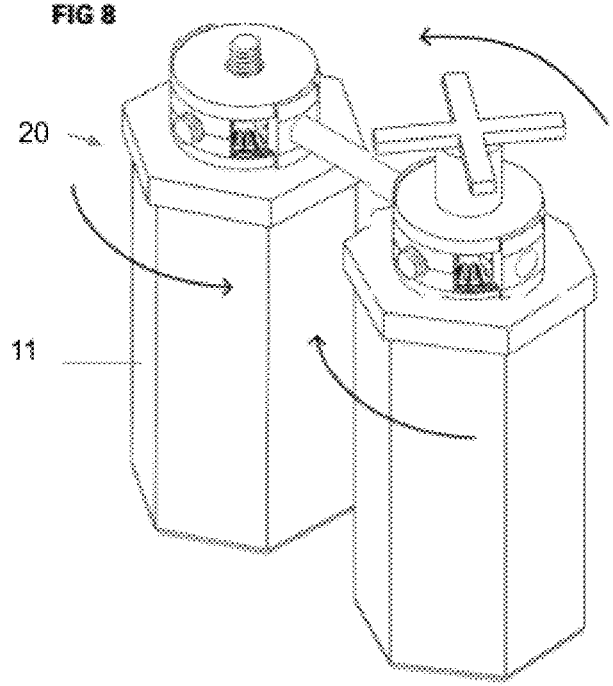
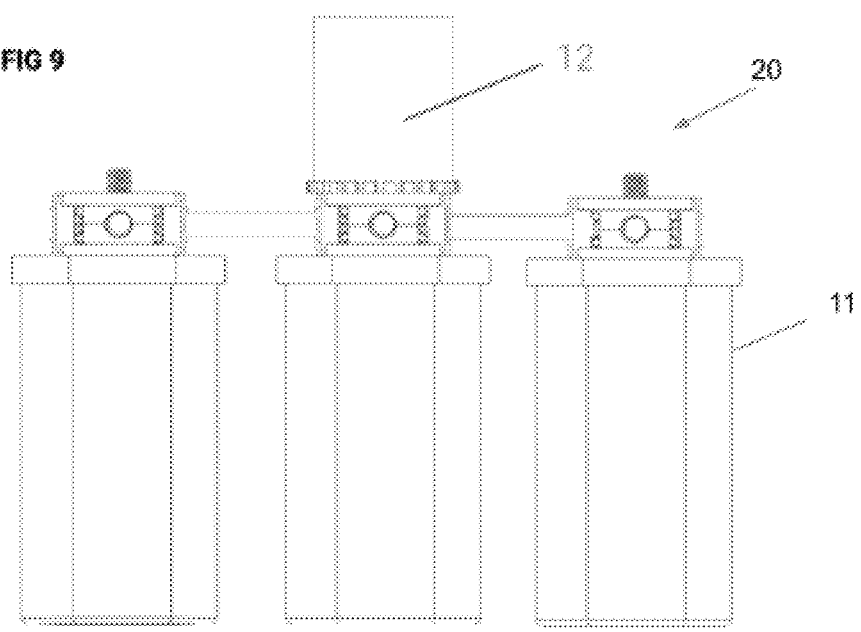

SYSTEM AND METHOD FOR SYNCHRONIZED MOVEMENT OF OBJECTS IN FRONT OF A CAMERA LENS

CROSS-REFERENCES TO RELATED APPLICATIONS

This application claims priority of the U.S. provisional patent application No. 63/304,568, filed on Jan. 28, 2022, entitled SYSTEM FOR SYNCHRONIZED MOVEMENT OF OBJECTS IN FRONT OF A CAMERA LENS by Nicholas Wong.

BACKGROUND OF THE INVENTION

1. Field of the Invention

This invention relates to the field of optical apparatuses for photographic and videographic creation. These optical apparatuses are typically mounted or otherwise placed in front of a camera.

2. Description of the Related Art

The advent of the camera has fueled a proliferation of the creation of accessories used to improve the camera's functionality. The term "camera" may refer herein inter alia to cameras incorporated in cell phones, tablets, and other equipment known in the art or to be developed in the future. These accessories include external filters, and connectors used to fixate filters to a camera. These filters may be used inter alia for changing the field of view, adding color, refracting light, and blurring. Filters can take many shapes and forms. Filters may be comprised of glass which may be shaped with facets, grooves, indents, or features otherwise. Filters could also be made of acrylics, plastics, paints, mirrors, lights, or other materials which can be used to achieve an optical effect. When filters are placed in front of a camera, they may change the path of light into a camera lens. In other words, they may bend, reflect, or refract light, which is intended as it is artistically desirable. In the case of faceted glass filters, glass may consist of non-parallel external faces which cause light to refract internally before exiting the glass filter and entering a camera's lens. A window would be an example of parallel paned glass that refracts light in a linear manner. A triangular prism would be an example of non-parallel paned glass that refracts light in a non-linear manner. That is, looking directly through a triangular prism will not reveal an item placed behind it, it will bend light and reveal an adjacent scene in the environment. Most existing filters are limiting as they are fixed in their position relative to a camera. While some systems allow filters to be moved such as in WO/2020/257529, they are not intended to allow a synchronous movement of filters which may be artistically desirable.

The terms "image-making lens", "camera lens" and "lens" may be used interchangeably hereinafter.

The terms "filters", "light modifying objects", "objects", "light modifying members", "light path modifying members", and "members" may be used interchangeably hereinafter.

The terms "rod", "axle", "spindle", "shaft", and "pivot" may be used interchangeably hereinafter.

The terms "device" and "system" may be used interchangeably hereinafter.

The terms "transmission", "propulsion transmission", "drivetrain" "train", "gear train" and "motion train" may be used interchangeably hereinafter.

SUMMARY OF EMBODIMENTS OF THE INVENTION

The present invention is intended to facilitate the creation of artistic effects in photography and videography, made possible by synchronous movement of light path modifying objects.

A device according to some aspects of the present invention includes a manipulator whose operation synchronously alters the position of light path modifying members. The device may include a connection to a camera. Alteration of position may include changing the members' yaw, roll, and pitch. This can include rotating the member around its axis. In some embodiments of the present invention a combination of light path modifying members with different light properties is used. The members can be made of various materials such as metals, plastics, glass, and gels. In some examples, different parts of the same member can have different light properties. In some cases, the members are replaceable. In some embodiments the members are placed around a space free of objects. The free space may be three-dimensional. In this case, the manipulator may be operated to change the placement of the members around the free space, whether it is two or three-dimensional. In some cases, the manipulator is operated with a handle or by a motor. The device may include one or more motors to drive the manipulator. The motors are connected communicatively and operate to alter the members' positions synchronously. The manipulator may include a transmission which may include gears, lead screws, belts, clutches, brakes, pulleys, chains, magnets, electromagnets, sprockets, shafts, and axles. For example, a transmission that includes conical gears each of which is connected to one or more light path modifying members, and at least one shaft transmitting rotational motion between two or more conical gears. In some examples, the shaft's position can be changed such that the angle formed between the axis of rotation of the shaft and the axes of rotation of the members changes.

A device according to some embodiments includes a number of light path modifying members and a manipulator that includes a hoop-shaped base with a number of first holes, a rotating ring with a number of second holes, and a ring-shaped main gear slidable on the base. The movement of the rotating ring causes an angle change of the light path modifying members relative to the tangent of the rotating ring. The main gear has inward-facing teeth. Each of the light path modifying members is connected to a conical gear, to a first rod, and to a second rod. Each first rod is inserted and rotatable within a first hole, and each second rod is inserted and rotatable within a second hole. A number of intermediary gears which the first rods serve as their pivot, transmit a rotational motion from the main gear to the conical gears. The main gear may include outward-facing teeth, such that the main gear would be engaged by a drive gear.

A method creating artistic effects in photography according to some aspects of the invention includes synchronously altering position of a plurality of light path modifying members. The method may include connecting the members to a camera.

A combination of light path modifying members with different light properties may be used. The members may have parts with different light properties. The method may include replacing the path modifying members to achieve various artistic effects. Altering the position of the path modifying members may include changing their yaw, roll, pitch and combinations thereof. The method may include placing the members around a space free of objects which can be two or three-dimensional. In this case, the method may include altering the placement of the members around the free space. In some embodiments, the altering of members' positions is made by power supplied by a motor.

BRIEF DESCRIPTION OF THE DRAWINGS

A complete understanding of the present embodiments and the advantages and features thereof will be more readily understood by reference to the following detailed description when considered in conjunction with the accompanying drawings. Embodiments of the present disclosure are illustrated as examples and are not limited by the figures of the accompanying drawings, in which like references may indicate similar elements and in which:

FIG. 7 illustrates schematically an isometric view of the transmission depicted in FIG. 1 connected to a handle and to two light path modifying objects in the shape of a six-face polyhedron.

FIG. 8 illustrates schematically the directions of rotation of the light path modifying objects described in FIG. 7.

FIG. 9 illustrates schematically a device according to embodiments of the invention, similar to those shown in FIGS. 7 and 8 but including three light path modifying objects and a motor to drive the transmission.

DETAILED DESCRIPTION OF THE INVENTION

Figure 1:
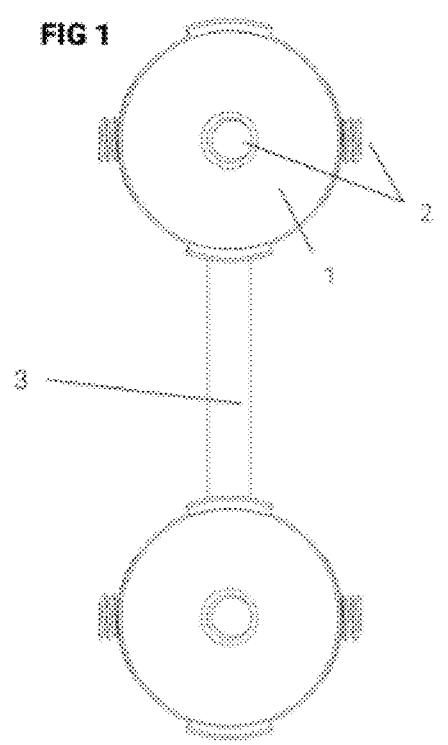
FIG. 1 illustrates schematically a transmission for synchronizing the motion of objects in front of a camera according to some embodiments of the present invention.

The specific details of the single embodiment or variety of embodiments described herein are to the described system and methods of use. Any specific details of the embodiments are used for demonstration purposes only, and no unnecessary limitations or inferences are to be understood thereon. Before describing in detail exemplary embodiments, it is noted that the embodiments reside primarily in combinations of components and procedures related to the system. Accordingly, components have been represented, where appropriate in the drawings, showing only those details that are pertinent to understanding the embodiments of the present disclosure so as not to obscure the disclosure with details that will be readily apparent to those of ordinary skill in the art having the benefit of the description herein.

Filters are placed in front of a camera, to change the path of light into a camera lens. For example, filters may bend, reflect, or refract light, thus, creating artistically desirable effects. Usually, filters are fixedly placed relative to a camera but there exist devices that allow filters to be moved relative to a camera lens. Yet those devices do not allow synchronous movement of filters which may be artistically desirable.

The present invention is intended to facilitate the creation of artistic effects in photography and videography, made possible by synchronous movement of light path modifying objects. Embodiments of the present invention are directed to modify and/or add light entering a camera lens while capturing photographic still or moving images by placing objects in front of and around the image making lens. The objects may be transparent, translucent, and/or opaque. The objects can be of all kinds of shapes such as polyhedrons. In some cases, the light path modification is uniform around the camera field of view. In some examples, however, the objects have different light properties such as light emitting, and/or light reflecting, and/or light absorbing, and/or light scattering. In some embodiments, another optional object property is radiation other than visible light. In some examples, the objects differ in their light properties. For example, some objects are light emitting, and other objects are light absorbing, and so on. The different objects can be in different colors. In some examples, different light properties such as those mentioned above are combined in each one of the objects. For example, an object that part of its surface is light reflecting and other parts of its surface are light absorbing. Another example is that different parts of one object with different colors, and/or emit different light colors and/or emit different light intensities. Different objects with different combinations of light properties may be used. Other properties that their combination resides within the scope of the embodiments of the present invention are refractive index, light polarization, and transparency. Thus, it should be apparent now that any light property can be combined in objects according to embodiments of the present invention. In some examples objects with different properties can be replaced for achieving different effects at a different time using the same device. In some cases pertaining to embodiments of the present invention the position of the light path modifying objects relative to a camera lens should be carefully controlled in an effort to create artistically desirable images and videos. Further, a device according to some embodiments of the invention that allows for synchronization of the movement or placement of multiple objects relative to a camera lens can facilitate achieving more desirable and precise artistic effects.

A device, according to some embodiments of the invention includes a number of light path modifying objects which are rotatable and/or can be tilted. Between the objects, separates at least one empty space. The objects may be connected to a camera. In some cases, the objects are arranged such that the camera field of view is free of light path modifying objects.

A device according to some embodiments of the invention for controlling and manipulating objects' position in a light path of a camera lens includes one or more bases. Each base allows for the attachment of one or more objects through mount points. Each base includes a drivetrain and is connectable to other bases. When a number of bases are connected they form a unified drivetrain. In some examples, at least two objects, attached to one or more bases, can move in synchronization amongst their mount points, and relative to one another, as a result of the operation of the drivetrain. The operation of the drivetrain allows a synchronous alteration in the yaw, roll, pitch, circumferential or radial placement of the objects. In some examples, the rotation, yaw, roll, pitch, or radial placement of the mounting points relative to one another can be manipulated. The device according to some embodiments may include a motor in order to operate and control the operation of the drivetrain. The device may include a handle, grip, or another human-controllable mechanism for the operation and control of the drivetrain. The drivetrain may include a pulley-and-belt system, and/or a gear train. The drivetrain may be controlled by electromagnetism. The base or bases may embody a Hoberman circle-like device, allowing for manipulation of the position of the bases relative to one another. One or more of the light path modifying objects may include a light source for casting light. One or more of the objects may change the direction of a light path. The objects may be made of glass.

Figure 2:
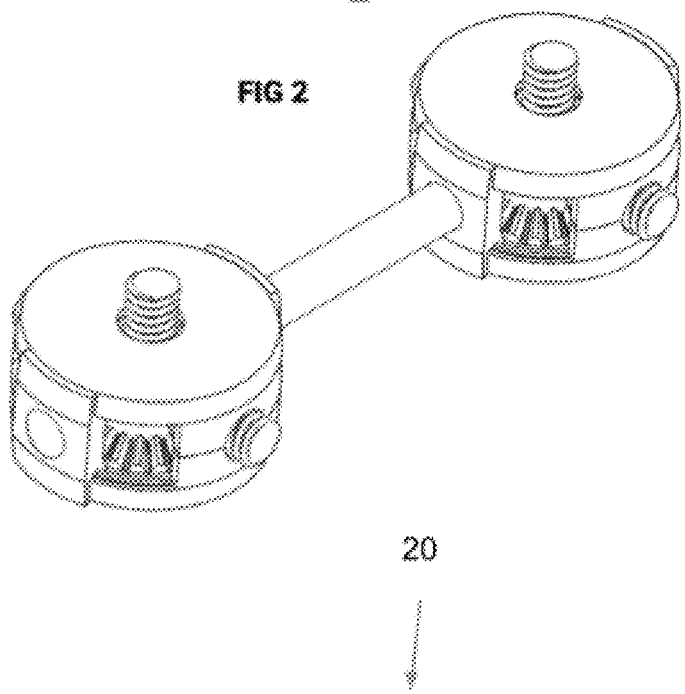
FIG. 2 illustrates schematically an isometric view of the transmission depicted in FIG. 1.
Figure 3:
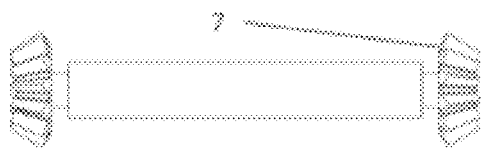
FIG. 3 illustrates schematically a shaft used to transmit rotary motion between gears according to some embodiments of the invention.
Figure 4:
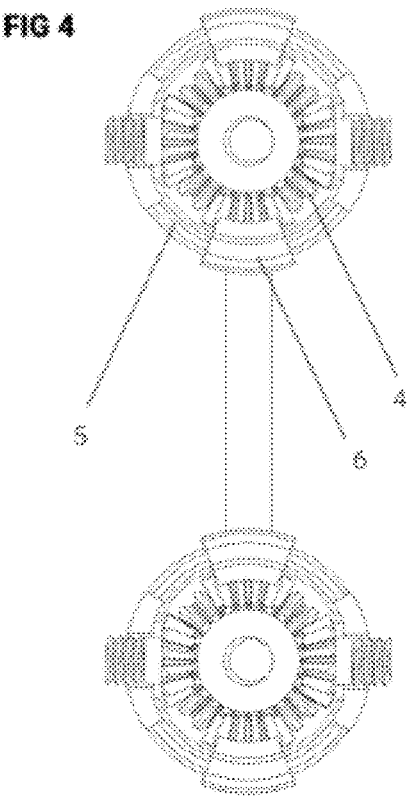
FIG. 4 illustrates schematically a cross-sectional view of the transmission depicted in FIG. 1.
Figure 5:
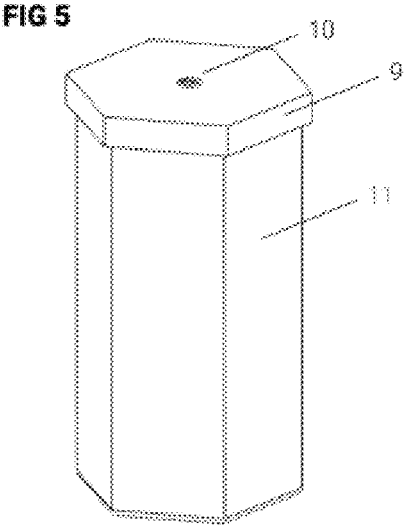
FIG. 5 illustrates schematically a light path modifying object, a part of a device according to some embodiments of the invention, in the shape of a six-face polyhedron.
Figure 6:
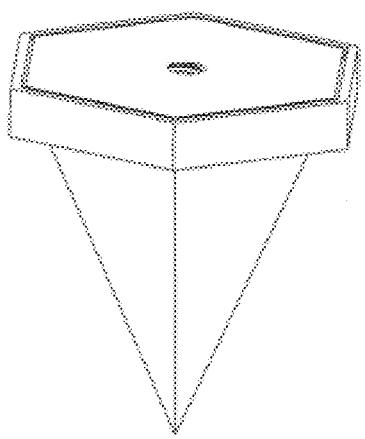
FIG. 6 illustrates schematically a light path modifying object, a part of a device according to some embodiments of the invention, according to some embodiments of the invention, in the shape of a hexagonal cone.
Figure 10:
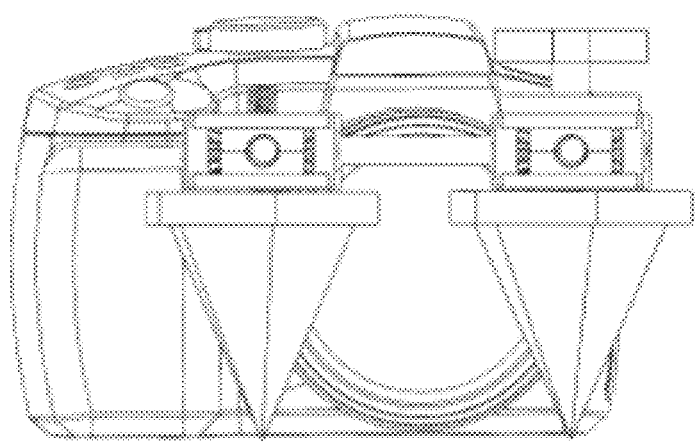
FIG. 10 illustrates schematically a device according to some embodiments placed in front of a camera lens.
Figure 11:
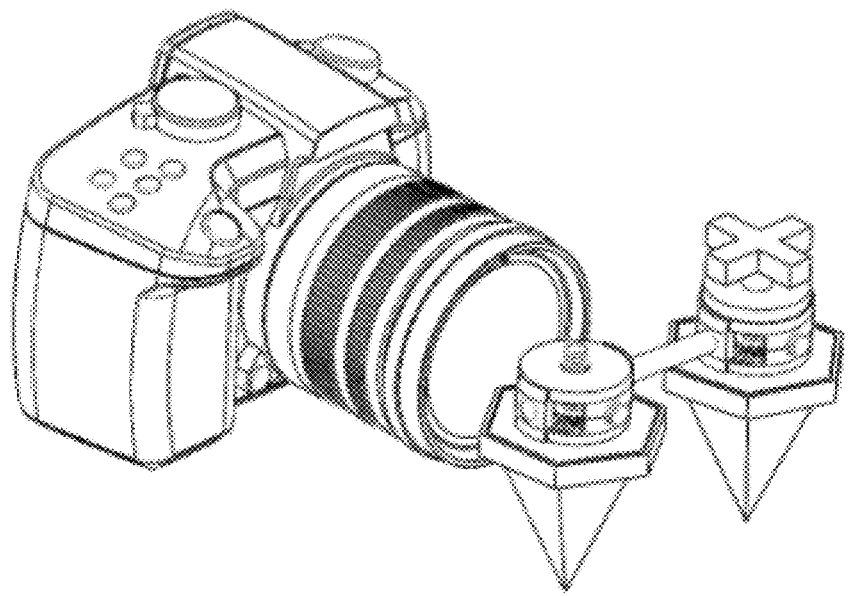
FIG. 11 illustrates schematically an isometric view of the device depicted in FIG. 10.
Figure 12:
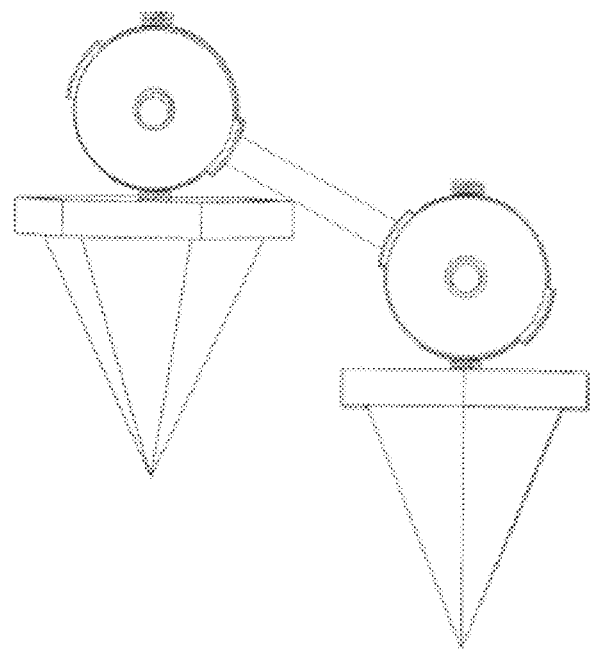
FIG. 12 illustrates schematically the relative position of light path modifying objects when the shaft is in a first position in a device according to some embodiments of the invention.
Figure 13:
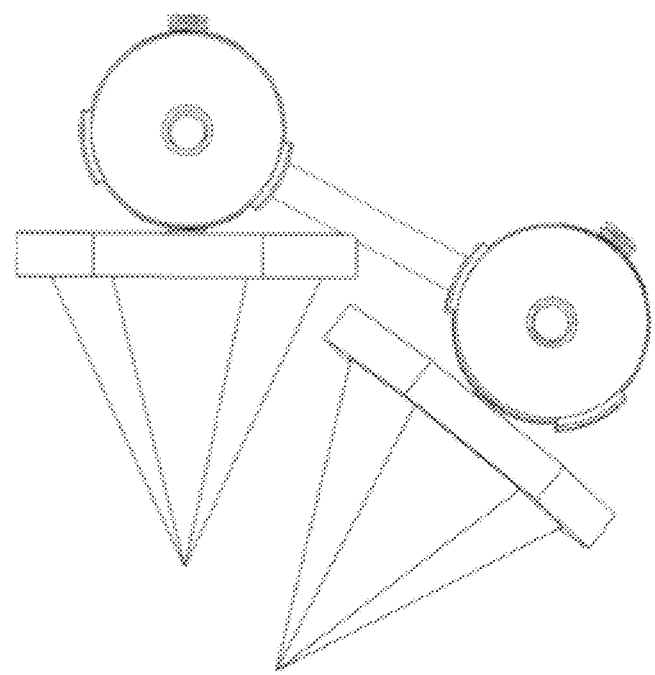
FIG. 13 illustrates schematically the same device depicted in FIG. 12 with the shaft in a second position.

In FIG. 1. appears a schematic illustration of propulsion transmission 20 for synchronizing the motion of objects in front of a camera according to some embodiments of the present invention. Transmission 20 gears are packed in two bases 1 that are connected by shaft 3. Also shown are mounting points 2 for attaching the light path modifying objects. An isometric view of transmission 20 appears in FIG. 2. As shown in FIG. 3, shaft 3 is connected to at least two gears 7, each of which is fixed at each one of its ends. A cross-sectional view of transmission 20 is shown in FIG. 4 where transmission gears 4 can be viewed, each of which is operative with at least one gear 7. Connection points 6 are also shown which are used to connect shaft 3 to base 1. Track 5 is used to move connection points 6 around the perimeter of base 1 to allow changing the relative positions among bases 1. A unified drivetrain is formed through the connection of a number of bases 1 with one or more shafts 3. Motion is transmitted through the drivetrain to mounting points 2 which are connected to gears 4. It can now be appreciated that the described unified drivetrain is modular as it allows connecting a number of bases 1 through shafts 3 according to choice. By utilizing slidable connection points 6, different spatial structures can be formed according to the location of the connection of shafts 3 around the perimeter of bases 1. In the embodiments depicted in FIGS. 1-4, only some of mounting points 2 are connected to rotating parts of the drivetrain—to gears 4. Yet, according to some embodiments, in some of bases 1, gears 4 may be installed in a different orientation. For example, perpendicular to those described in FIGS. 1-4. The reader may appreciate that different designs of bases 1 with gears 4 installed in different orientations can be implemented, as well as bases containing a number of gears. Other designs within the scope of embodiments of the invention involve incorporating belts and pulleys in the drivetrain. In some embodiments, magnets are integrated in the drivetrain. Schematic illustration of light path modifying objects according to some embodiments of the invention appears in FIGS. 5-6. Each light path modifying object 11, is connected to an object base 9 which includes connector 10 connectable to mounting point 2. In the example shown in FIGS. 1-6 mounting points 2 are studs while connectors 10 is are tapped holes. Light path modifying object 11 depicted in FIG. 5 in the shape of a six-face polyhedron, while in FIG. 6 the object is the shape of a hexagonal cone. The rotation of object 11 is caused by the rotation of gear 4 connected to object 11 through mounting point 2 and connector 10. Gears 4 may be driven by the rotation of gears 7. An assembly including the transmission 20 with two six-face polyhedron objects 11, is illustrated schematically in FIG. 7. The assembly includes also handle 8 used to operate transmission 20 that causes synchronous rotation of objects 11. The direction of rotation of handle 8 and objects 11 according to some embodiments is marked by the arrows in FIG. 8. In this example shown in FIG. 8, objects 11 rotate in opposite directions synchronously. Such synchronous movement and placement of a plurality of light path modifying objects were not found in existing devices. Controlled synchronized positioning of light path modifying objects may be desired by some end users. In embodiments corresponding to the above figures, the movement of the drivetrain allows for synchronous movement of the light path modifying objects with respect to one another amongst their respective mounting points. This allows precise control over the light path traveling through the objects toward a camera lens. Existing accessories may allow changing the position of a single object with respect to a camera lens but do not allow for a synchronous change in the position of a number of objects in the manner described above. The present invention Synchronization of motion, especially amongst the object's mounting points, is intended to allow the user to create desirable optical effects for photos and videos, e.g a kaleidoscope effect. Embodiments illustrated schematically in FIG. 9 are of a device that includes three light path modifying objects 11 and a motor driving the transmission 20. A schematic depiction of a device, according to some embodiments, placed in front of a camera lens appears in FIG. 10, that can be utilized to alter the direction of light as it enters a camera lens for creating unique optical effects. A schematic isometric illustration can be viewed in FIG. 11. A schematic illustration of the possibilities for changing the relative position of bases 1 by changing the position of connection point 6, can be seen in FIGS. 12 and 13. It should be noted that in the example shown in FIGS. 12 and 13, objects 11 are connected to mounting points 2 other than those to which objects 11 are connected as shown in FIGS. 7-11. This demonstrates the versatility allowed by the device.

A device according to some embodiments of the invention includes a plurality of light path modifying members and a manipulator consisting of at least two parts. A rotation of one part of the manipulator causes a synchronous rotation of the light path modifying members. A rotation of the other part allows for the position of the light path modifying members to be modified.

A device according to some embodiments includes a number of light path modifying members and a manipulator that includes a hoop-shaped base with a number of first holes, a rotating ring with a number of second holes, and a ring-shaped main gear slidable on the base. The movement of the rotating ring causes an angle change of the light path modifying members relative to the tangent of the rotating ring. The main gear has inward-facing teeth. Each of the light path modifying members is connected to a conical gear, to a first rod, and to a second rod. Each first rod is inserted and rotatable within a first hole, and each second rod is inserted and rotatable within a second hole. A number of intermediary gears which the first rods serve as their pivot, transmit a rotational motion from the main gear to the conical gears. The main gear may include outward-facing teeth, such that the main gear would be engaged by a drive gear.

Figure 14:
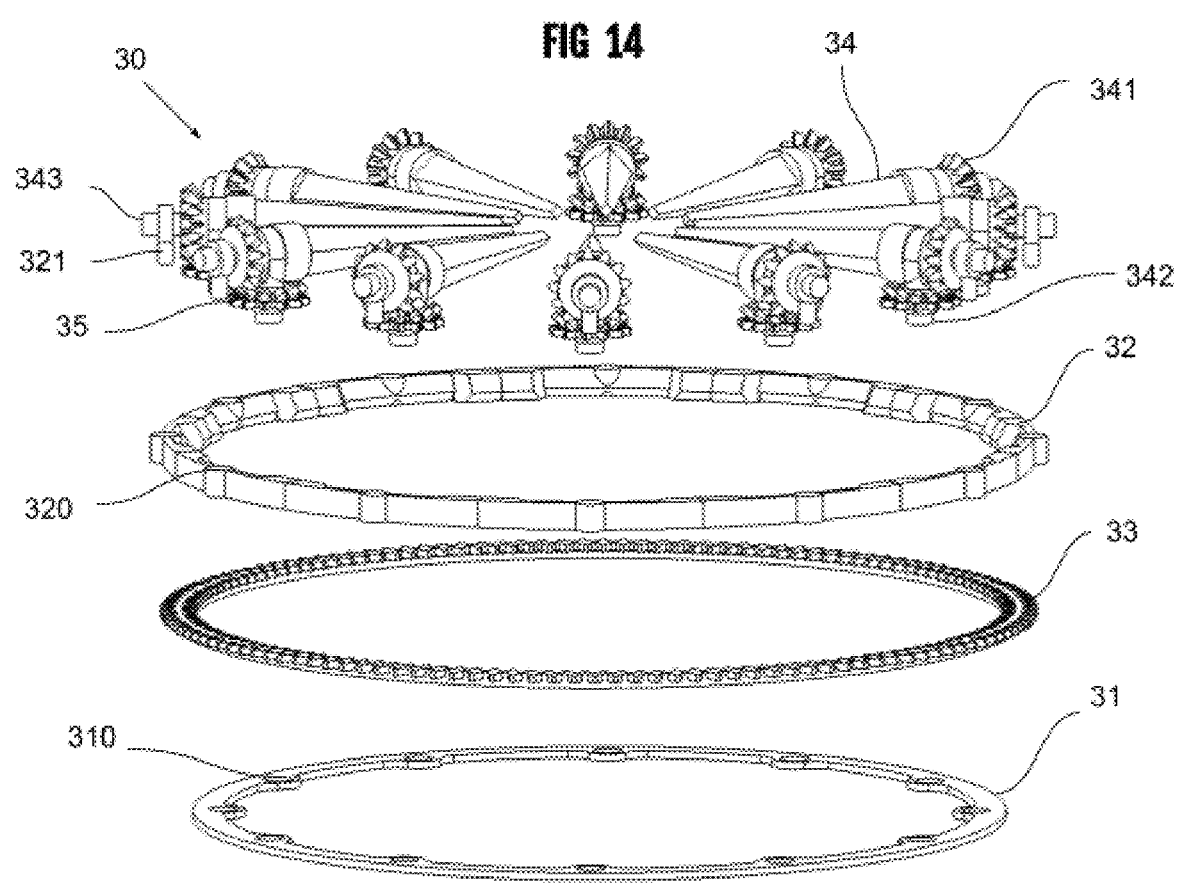
FIG. 14 illustrates schematically an exploded view of a circular device in accordance with some embodiments of the present invention
Figure 15:
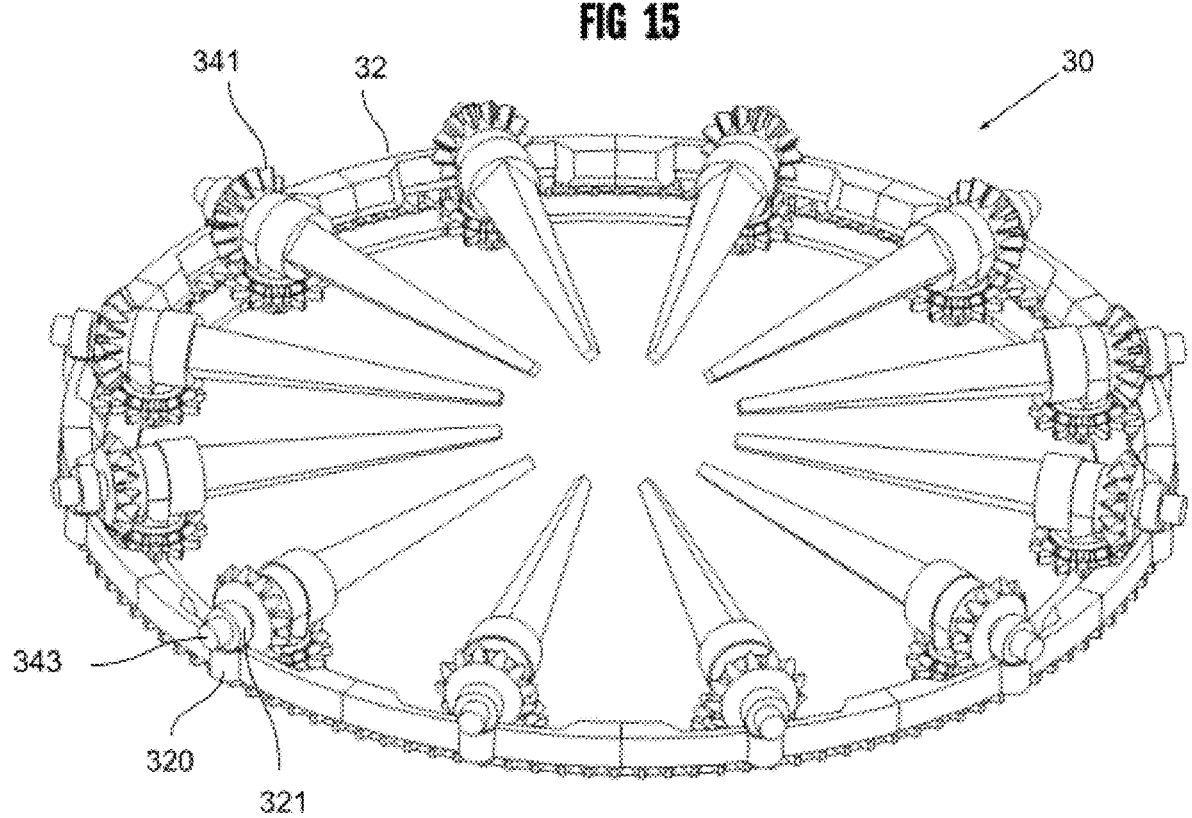
FIG. 15 illustrates schematically a circular device in accordance with some embodiments of the present invention
Figure 16:
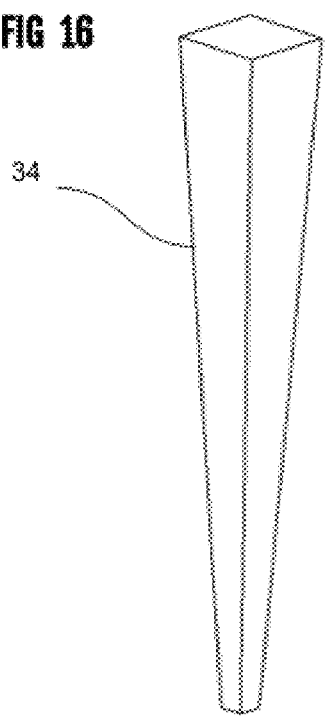
FIG. 16 illustrates schematically a light path modifying object in the shape of a square cone
Figure 17:
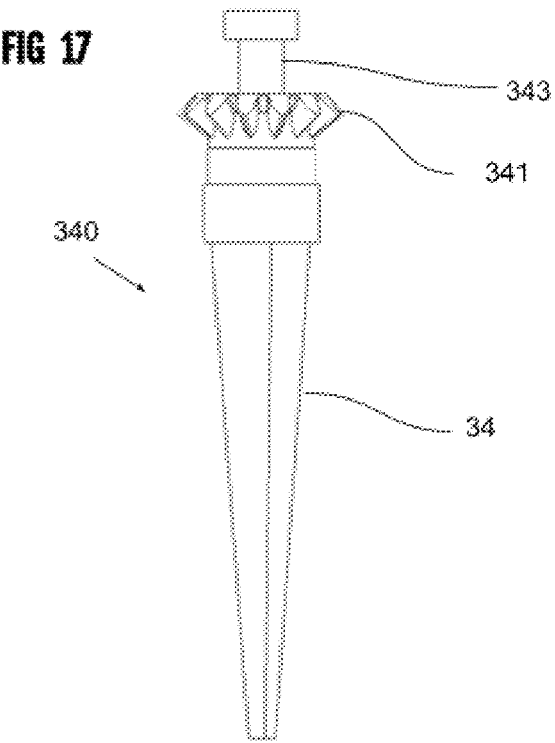
FIG. 17 illustrates schematically an assembly according to embodiments of the invention, of a light path modifying object, connected to a conical gear and to a rod.
Figure 18:
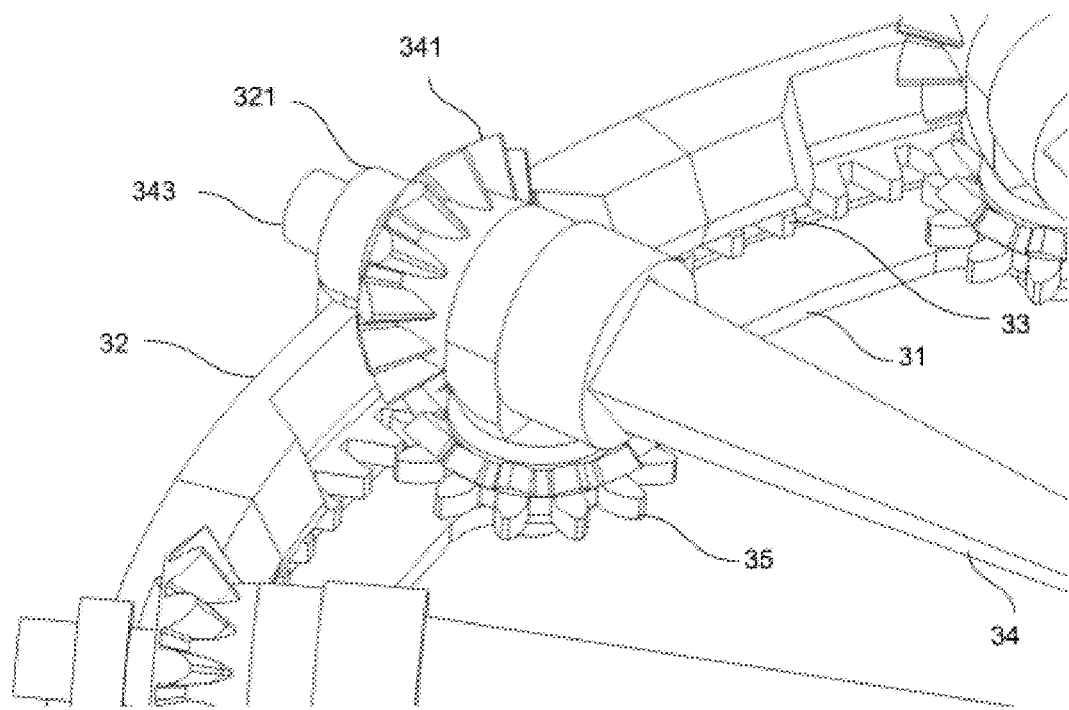
FIG. 18 illustrates schematically a section of a circular device according to embodiments of the invention
Figure 19:
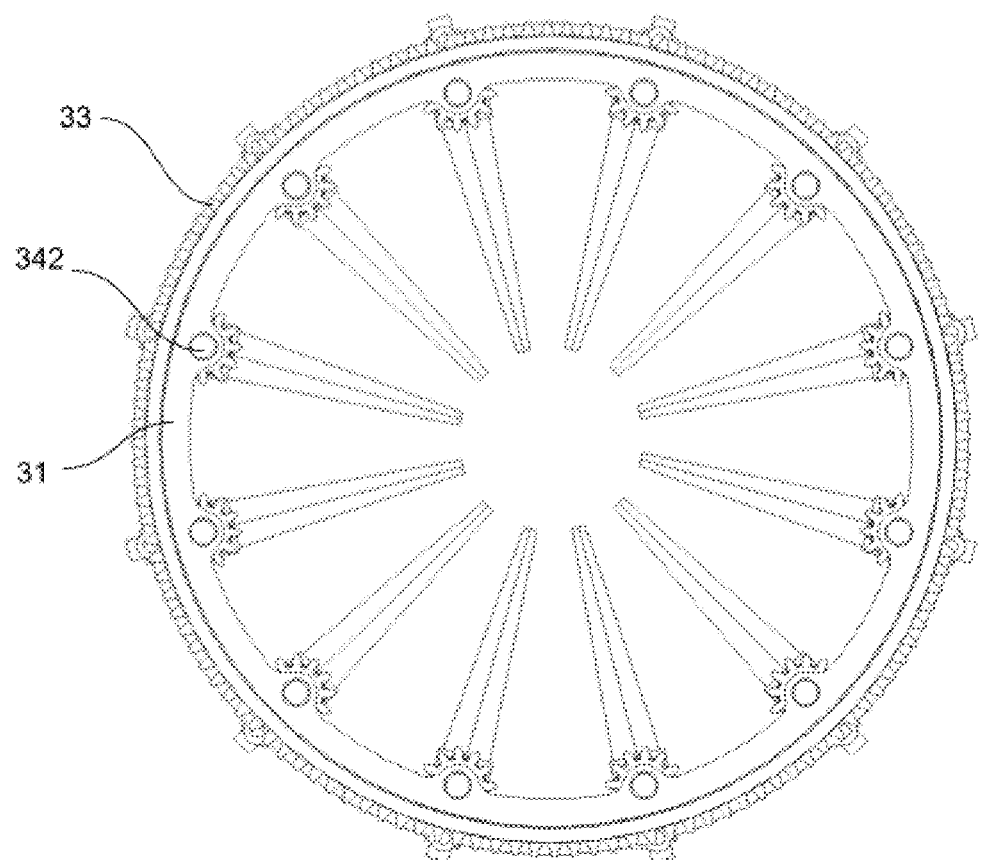
FIG. 19 illustrates schematically a view toward the base of a circular device according to embodiments of the invention
Figure 20:
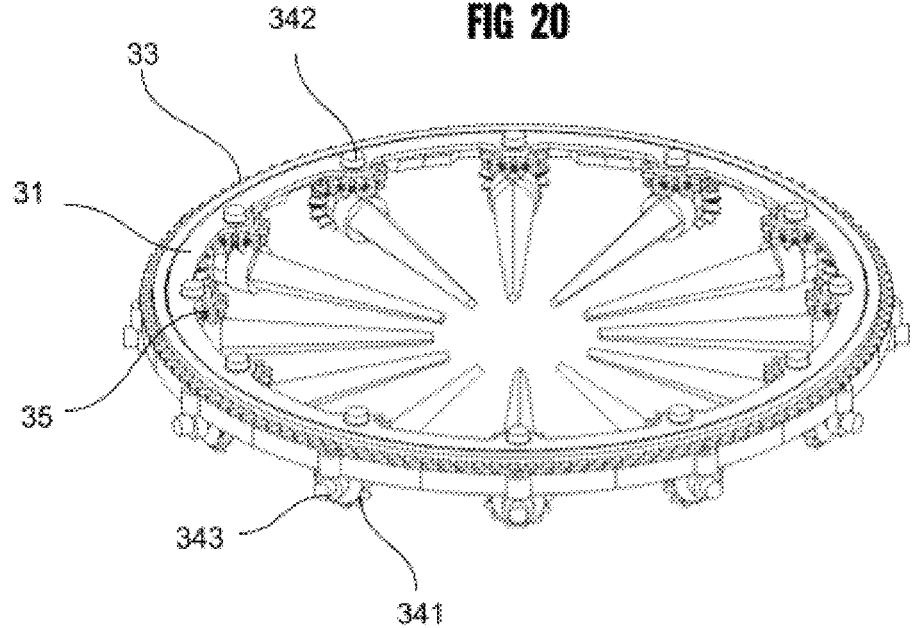
FIG. 20 illustrates schematically an isometric view toward the base of a circular device according to embodiments of the invention
Figure 21:
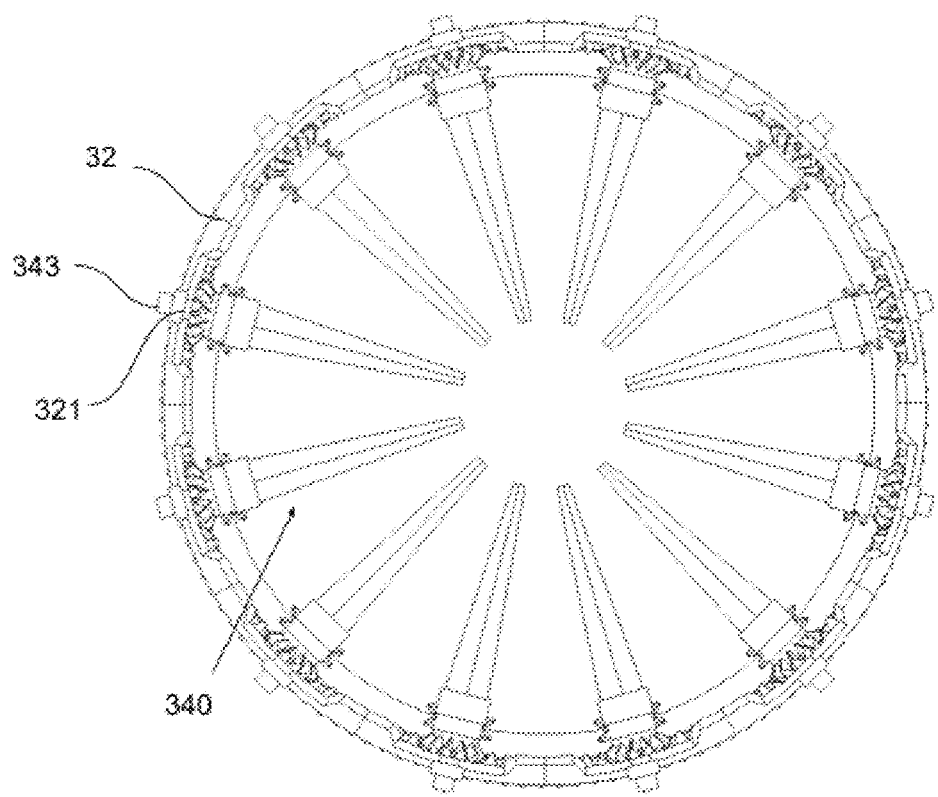
FIG. 21 illustrates schematically a circular device according to embodiments of the invention in one position
Figure 22:
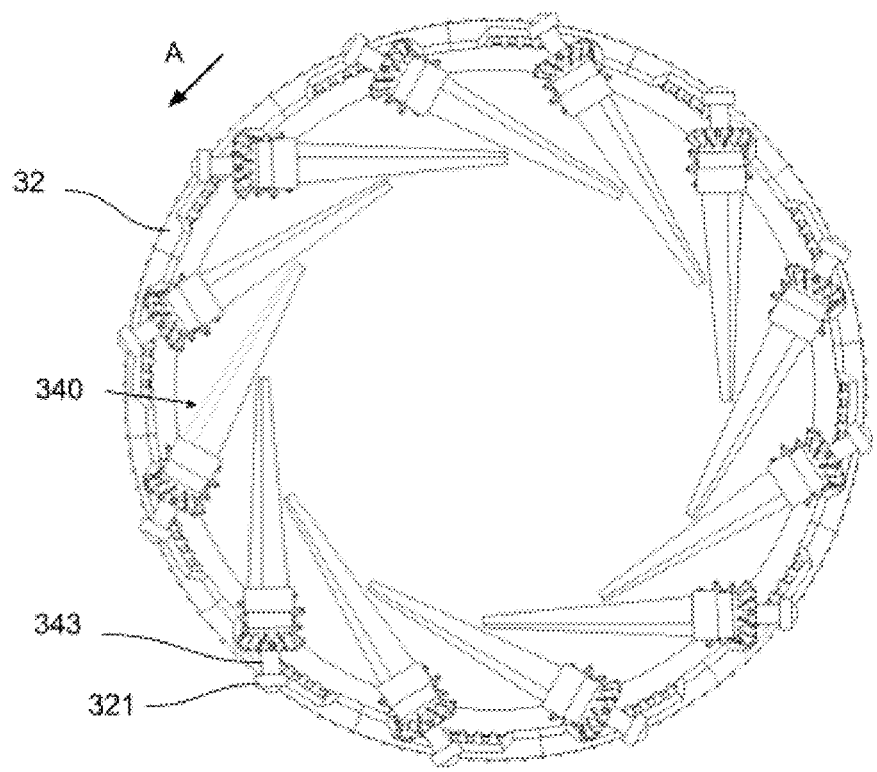
FIG. 22 illustrates schematically a circular device according to embodiments of the invention in a second position

An exploded view of circular device 30 in accordance with some embodiments of the present invention is illustrated schematically in FIG. 14 which shows manipulator 30 that includes hoop-shaped base 31 with a number of holes 310, rotating ring 32 with a number of holes 320, and ring-shaped main gear 33 slidable on base 31. Main gear 33 has inward-facing teeth and in some examples also outward-facing teeth to engage with one or more drive gears. Also shown are light path modifying members 34 each of which is connected to conical gear 341 to rod 342 and to rod 343. Also shown are intermediary gears 35. Assembled circular device 30 is illustrated schematically in FIG. 15. Each rod 342 is rotatable within hole 310, and each rod 343 is rotatable within a hole in the rotating pedestal 321. Pedestals 321 are connected to holes 320 and are rotatable within holes 320. Rods 342 serve as pivots for gears 35 which serve to transmit a rotational motion from main gear 33 to conical gears 341. Rotation of ring 32 causes an angle change of light path modifying members 34 relative to the tangent of ring 32. Square cone light path modifying object 34 is illustrated schematically in FIG. 16. Assembly 340 of member 34, gear 341, and rod 343 is illustrated schematically in FIG. 17. A section of circular device 30 is illustrated schematically in FIG. 18, including, base 31, main gear 33, ring 32, gear 35, member 34, gear 341, and rod 343. A view toward base 31 is illustrated schematically in FIG. 19. From viewing FIG. 18 the reader may appreciate the manner in which members 34 are caused to rotate by the transfer of rotary motion from main gear 33 through gear 35 and gear 34. The reader can appreciate as well that the direction of rotation of members 34 is determined by the direction of rotation of main gear 33. The change in the angles of members 34 relative to ring 32 is illustrated schematically in FIGS. 21 and 22. The change in the angles of members 34 is caused by rotating ring 32. When ring 32 rotates, pedestals 321 move along with ring 32 while pushing rods 343, causing the rotation of assemblies 340 around the rotational axes of rods 342. Device 30 when members 34 face inward at a right angle relative to ring 32 is shown in FIG. 21. Device 30 after a change in the angle of members 34 compared to FIG. 21 is shown in FIG. 22. The direction of rotation of ring 32, compared to its previous position shown in FIG. 21, is indicated by arrow A. The reader may appreciate that the direction of change in the angles of members 34 is determined by the direction of rotation of ring 32.

It should be understood that elements and/or features of an apparatus, or a method described herein can be combined in a variety of ways without departing from the spirit and scope of the present teachings, whether explicit or implicit herein. For example, where reference is made to a particular structure, that structure can be used in various embodiments of apparatus of the present teachings and/or in methods of the present teachings, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

It should be understood that the expression "at least one of" includes individually each of the recited objects after the expression and the various combinations of two or more of the recited objects unless otherwise understood from the context and use.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

The use of any and all examples, or exemplary language herein, for example, "such as," "including," or "for example," is intended merely to better illustrate the present teachings and does not pose a limitation on the scope of the invention unless claimed. No language in the specification should be construed as indicating any non-claimed element as essential to the practice of the present teachings.

The present teachings encompass embodiments in other specific forms without departing from the spirit or essential characteristics thereof. The foregoing embodiments are therefore to be considered in all respects illustrative rather than limiting on the present teachings described herein.

The invention claimed is:

1. A device for creation of artistic effects in photography comprising:
    a plurality of polyhedron light path modifying members placed in front of a camera, said light travels through said members toward at least one lens of said camera; and
    a manipulator operative with said members,
    wherein said operation of said manipulator causes said members to rotate around their axes,
    wherein said manipulator operable to cause alteration of said members position synchronously, said alteration of position comprising at least two position alteration selected from the group consisting of yaw, roll, and pitch.

2. The device of claim 1, wherein said light path modifying members with different light properties are combined.

3. The device of claim 1, wherein said light path modifying members are of materials selected from the group consisting of, plastics, glass, gels, and combinations thereof.

4. The device of claim 1, wherein at least part of said light path modifying members comprise parts with different light properties.

5. The device of claim 1, wherein said light path modifying members are replaceable.

6. The device of claim 1, wherein said members are placed around a space free of objects.

7. The device of claim 6 wherein said space is three-dimensional.

8. The device of claim 6, wherein said alteration of position is an alteration of said members placement around said free space.

9. The device of claim 1 wherein said device further comprises a connector to a camera.

10. The device of claim 1 wherein said manipulator is operated with a handle.

11. The device of claim 1 wherein said device comprising at least one motor to drive said manipulator.

12. The device of claim 11 wherein each motor connected to at least one of said members, said motors are connected communicatively, wherein said motors operate synchronously to cause alteration of said members position synchronously.

13. The device of claim 1 wherein said manipulator comprises transmission.

14. The device of claim 13 wherein said transmission comprises power transmission elements selected from the group consisting of gears, lead screws, belts, clutches, brakes, pulleys, chains, magnets, electromagnets, sprockets, shafts, axles, and combinations thereof.

15. The device of claim 13 wherein said transmission comprising at least two conical gears each of which connected to at least one of said light path modifying members, and at least one shaft for transmitting rotational motion between at least two of said plurality of conical gears.

16. The device of claim 15 wherein said shaft position can be changed such that an angle formed between an axis of rotation of said shaft and axes of rotation of said members changes.

17. The device of claim 1 wherein said manipulator comprises:
a hoop-shaped base with a plurality of first holes;
a rotating ring with a plurality of second holes;
a ring-shaped main gear slidable on said base, said main gear comprising inward-facing teeth;
a plurality of said light path modifying members, each of which connected to a conical gear, to a first rod, and to a second rod, each of said first rods inserted and rotatable within said first holes, each of said second rods inserted and rotatable within said second holes;
a plurality of intermediary gears, each of said first rods serves as a pivot for each of said intermediary gears, said intermediary gears transmitting rotational motion from said main gear to said conical gears,
wherein a movement of said rotating ring causes an angle change of said light path modifying members relative to the tangent of said rotating ring.

18. The device of claim 17, wherein said main gear comprising outward-facing teeth.

19. A method for creation of artistic effects in photography comprising synchronously altering position of a plurality of polyhedron light path modifying members placed in front of a camera, said light travels through said members toward at least one lens of said camera,
wherein said altering position comprising at least two position alteration selected from the group consisting of yaw, roll, and pitch.

20. The method of claim 19 wherein said light path modifying members with different light properties are combined.

21. The method of claim 19 wherein at least part of said light path modifying members comprise parts with different light properties.

22. The method of claim 19 comprising replacing at least one of said path modifying members to achieve various artistic effects.

23. The method of claim 19 comprising placing said members around a space free of objects.

24. The method of claim 23 said space is three-dimensional.

25. The method of claim 23 comprising altering of said members placement around said free space.

26. The method of claim 19 comprising connecting said members to a camera.

27. The method of claim 19 wherein said altering is made with at least one motor.

\* \* \* \* \*